United States Patent
Zhang et al.

(10) Patent No.: US 10,734,738 B2
(45) Date of Patent: Aug. 4, 2020

(54) SINGLE BAND DUAL CONCURRENT NETWORK DEVICE

(71) Applicant: Extreme Networks, Inc., San Jose, CA (US)

(72) Inventors: Liangfu Zhang, Hangzhou (CN); George Gang Chen, Fremont, CA (US); Changming Liu, Cupertino, CA (US); Zhenye Cao, Hangzhou (CN)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 16/260,073

(22) Filed: Jan. 28, 2019

(65) Prior Publication Data

US 2019/0157774 A1 May 23, 2019

Related U.S. Application Data (63) Continuation of application No. 15/791,235, filed on Oct. 23, 2017, now Pat. No. 10,193,239, which is a (Continued)

(51) Int. Cl.
*H01Q 21/28* (2006.01)
*H04B 1/40* (2015.01)
(Continued)

(52) U.S. Cl.
CPC ......... *H01Q 25/001* (2013.01); *H01Q 1/2291* (2013.01); *H01Q 21/24* (2013.01);
(Continued)

(58) Field of Classification Search
CPC combination set(s) only.
See application file for complete search history.

(56) References Cited

U.S. PATENT DOCUMENTS

| | | |
|---|---|---|
| 2,480,186 A | 8/1949 | Gilbert |
| 2,639,382 A | 5/1953 | Jarvis |

(Continued)

FOREIGN PATENT DOCUMENTS

| | | |
|---|---|---|
| CN | 101453304 | 6/2009 |
| CN | 102217211 | 10/2011 |

(Continued)

OTHER PUBLICATIONS

Xirrus, Inc., "Solutions Brief: Migrating to 802.11ac Wireless LANs," white paper, Mar. 10, 2014.

(Continued)

*Primary Examiner* — Ganiyu A Hanidu
(74) *Attorney, Agent, or Firm* — Sterne, Kessler, Goldstein & Fox P.L.L.C.

(57) ABSTRACT

A network device comprising, a first radio module configured to transmit and receive first radio signals in a first frequency band, a first antenna array configured to transmit and receive the first radio signals for the first radio module in the first frequency band, a second radio module configured to transmit and receive second radio signals in the first frequency band, a second antenna array configured to transmit and receive the second radio signals for the second radio module in the first frequency band, wherein, in operation, the first radio module and the second radio modules function concurrently using the first frequency band while at least 40 dB of antenna isolation is maintained between the first antenna array and the second antenna array.

20 Claims, 4 Drawing Sheets

Related U.S. Application Data continuation of application No. 15/066,955, filed on Mar. 10, 2016, now Pat. No. 9,812,791.

(60) Provisional application No. 62/131,769, filed on Mar. 11, 2015.

(51) Int. Cl.

| | |
|---|---|
| *H01Q 1/22* | (2006.01) |
| *H01Q 21/24* | (2006.01) |
| *H04B 1/18* | (2006.01) |
| *H01Q 25/00* | (2006.01) |

(52) U.S. Cl.
CPC .............. *H01Q 21/28* (2013.01); *H04B 1/18* (2013.01); *H04B 1/40* (2013.01)

(56) References Cited

U.S. PATENT DOCUMENTS

| | | | |
|---|---|---|---|
| 3,348,228 A | 10/1967 | Melancon | |
| D363,935 S | 11/1995 | McGreevy | |
| 5,583,524 A | 12/1996 | Milroy | |
| 6,967,625 B1 | 11/2005 | Honda | |
| 7,123,207 B2 | 10/2006 | Yazdandoost | |
| D550,633 S | 9/2007 | Gupta | |
| D558,189 S | 12/2007 | Inoue | |
| 7,388,553 B2 | 6/2008 | Yuanzhu | |
| 7,486,249 B2 | 2/2009 | Fujita | |
| 7,564,423 B2 | 7/2009 | Ke | |
| D608,769 S | 1/2010 | Bufe | |
| 8,165,050 B2 * | 4/2012 | Ngo | H04W 74/02 |
| | | | 370/311 |
| D695,279 S | 12/2013 | Yang | |
| D695,280 S | 12/2013 | Yang | |
| D695,725 S | 12/2013 | Taeger | |
| D708,602 S | 7/2014 | Gosalia | |
| D764,447 S | 8/2016 | Yang | |
| D766,884 S | 9/2016 | Zheng | |
| D767,544 S | 9/2016 | Yang | |
| D782,448 S | 3/2017 | Gosalia | |
| D784,965 S | 4/2017 | Chang | |
| D788,082 S | 5/2017 | Zheng | |
| D788,083 S | 5/2017 | Zheng | |
| D795,228 S | 8/2017 | He | |
| D795,847 S | 8/2017 | He | |
| D797,708 S | 9/2017 | Yang | |
| D801,956 S | 11/2017 | He | |
| D803,200 S | 11/2017 | Manivannan | |
| 2002/0173337 A1 | 11/2002 | Hajimiri | |
| 2003/0193923 A1 * | 10/2003 | Abdelgany | H04B 1/005 |
| | | | 370/342 |
| 2003/0206076 A1 * | 11/2003 | Hashemi | H03F 1/223 |
| | | | 333/32 |
| 2004/0183726 A1 | 9/2004 | Theobold | |
| 2005/0062649 A1 | 3/2005 | Chiang | |
| 2005/0243007 A1 | 11/2005 | Ke | |
| 2006/0281488 A1 | 12/2006 | Chang | |
| 2007/0069968 A1 | 3/2007 | Moller | |
| 2007/0097012 A1 | 5/2007 | Sanelli | |
| 2007/0241986 A1 | 10/2007 | Lee | |
| 2008/0205509 A1 | 8/2008 | Le Naour | |
| 2008/0225758 A1 | 9/2008 | Proctor | |
| 2009/0289867 A1 | 11/2009 | Chen | |
| 2011/0149164 A1 | 6/2011 | Goldberg et al. | |
| 2011/0241953 A1 | 10/2011 | Su | |
| 2012/0164948 A1 | 6/2012 | Narasimha | |
| 2012/0250666 A1 | 10/2012 | Bhukania | |
| 2012/0314626 A1 | 12/2012 | Alapuranen | |
| 2013/0134471 A1 | 5/2013 | Lee | |
| 2013/0181878 A1 | 7/2013 | Petros | |
| 2013/0300502 A1 | 11/2013 | Li | |
| 2013/0315141 A1 | 11/2013 | Hornchaudhuri | |
| 2014/0062812 A1 | 3/2014 | Smith | |
| 2014/0119245 A1 | 5/2014 | Desjardins | |
| 2014/0313093 A1 | 10/2014 | Smith | |
| 2014/0349592 A1 * | 11/2014 | Okazaki | H04B 1/50 |
| | | | 455/75 |
| 2015/0036656 A1 * | 2/2015 | McCarthy | H04B 7/0689 |
| | | | 370/331 |

FOREIGN PATENT DOCUMENTS

| | | |
|---|---|---|
| CN | 202997053 | 6/2013 |
| CN | 103268980 | 8/2013 |
| CN | 104052529 | 9/2014 |
| WO | 2007076105 | 7/2007 |

OTHER PUBLICATIONS

European Patent Application No. 15884897.8, Search Report dated Sep. 10, 2018.
European Patent Application No. 16762678.7, Search Report dated Sep. 10, 2018.
International Application No. PCT/US2015/048396, International Search Report and Written Opinion dated Nov. 27, 2015.
International Application No. PCT/US2016/022206, International Search Report and Written Opinion dated Jun. 3, 2016.

* cited by examiner

SINGLE BAND DUAL CONCURRENT NETWORK DEVICE

CROSS-REFERENCE TO RELATED APPLICATIONS

This application is a continuation of U.S. patent application Ser. No. 15/791,235, filed Oct. 23, 2017, which is a continuation of U.S. patent application Ser. No. 15/066,955, filed Mar. 10, 2016, now U.S. Pat. No. 9,812,791, which claims priority to U.S. Provisional Application No. 62/131,769, filed Mar. 11, 2015, all of which are incorporated herein by reference.

BACKGROUND

An area of ongoing research and development is network devices and antenna designs. In particular, access points are being developed with two radios that can operate in the same frequency band. One issue is that interference caused by two radios operating in the same frequency band concurrently makes concurrent operation difficult. One solution is to make access points larger in order to physically isolate the antennas of the two radios. This is impractical as access points typically are of a compact size. Another solution is to dynamically switch operation of the two radios. This is problematic in that the access point does not actually have two radios operating in the same frequency band simultaneously.

There therefore exists a need for practically-sized network devices with radios that can operate in the same frequency band concurrently.

The foregoing examples of the related art and limitations related therewith are intended to be illustrative and not exclusive. Other limitations of the relevant art will become apparent to those of skill in the art upon reading the specification and studying the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various implementations include network devices and antenna designs for network devices with radios that can operate in the same frequency band concurrently.

In various implementations, a first radio module is configured to transmit and receive first radio signals in a first frequency band, a first antenna array comprised of a first plurality of polarized antennas is configured to transmit and receive the first radio signals for the first radio module in the first frequency band, a second radio module is configured to transmit and receive second radio signals in the first frequency band, a second antenna array comprised of a second plurality of polarized antennas is configured to transmit and receive the second radio signals for the second radio module in the first frequency band, wherein, in operation, the first radio module and the second radio modules function concurrently using the first frequency band while at least 40 dB of antenna isolation is maintained between the first antenna array and the second antenna array.

These and other advantages will become apparent to those skilled in the relevant art upon a reading of the following descriptions and a study of the several examples depicted in the drawings.

DETAILED DESCRIPTION

Figure 1:
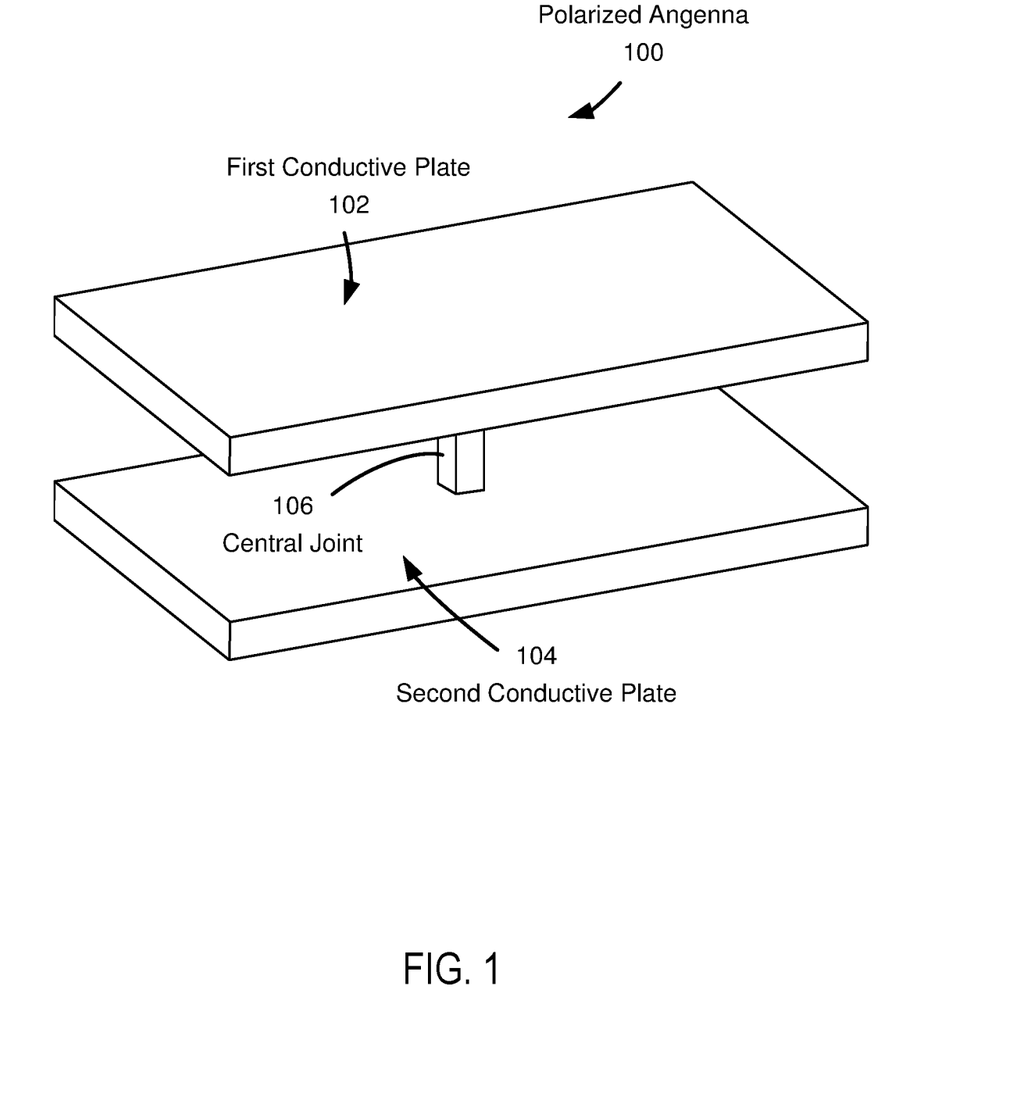
FIG. 1 depicts a perspective view of an example of a polarized antenna.

FIG. 1 depicts a perspective view 100 of an example of a polarized antenna. The polarized antenna can be implemented as part of a network device for transmitting and receiving data according to applicable protocols for forming part of a wireless network, including Wi-Fi, such as the IEEE 802.11 standards, which are hereby incorporated by reference. Depending upon implementation-specific or other considerations, the polarized antenna can be positioned to be horizontally polarized with respect to a network device.

In a specific implementation, the polarized antenna is wirelessly coupled through a Wi-Fi connection to an end user device, which acts as or includes a station. A station, as used in this paper, can be referred to as a device with a media access control (MAC) address and a physical layer (PHY) interface to a wireless medium that complies with the IEEE 802.11 standard. Thus, for example, the end user devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the polarized antenna is part of a network device which is compliant with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5

GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the polarized antenna is coupled to a radio. Depending upon implementation-specific or other considerations, a radio can be a 2.4 GHz to 5 GHz dual band radio or a 5 GHz only radio. Further depending upon implementation-specific or other considerations, the polarized antenna can be included as part of a network device that includes radios operating in the same frequency band concurrently. For example, the polarized antenna can be included as part of a network device including a first radio operating the 5 GHz band concurrently with a second radio operating in the 5 GHz band. In another example, the polarized antenna can be included as part of a network device including a 2.4 GHz to 5 GHz dual band radio operating in the 5 GHz band concurrently with a 5 GHz only radio operating in the 5 GHz band.

The polarized antenna depicted in FIG. 1 includes a first conductive plate 102 in a first antenna plane and a second conductive plate 104 in a second antenna plane. The first conductive plate 102 and the second conductive plate 104 are mounted together about a central joint 106 such that the first conductive plate 102 and the second conductive plate 104 overlay each other. The joint can be fixed such that the first antenna plane and the second antenna plane are parallel to each other or flexible such that the first antenna plane and the second antenna plane intersect each other. In various implementations, the first conductive plate 102, the second conductive plate 104, and the central joint 106 are comprised of, at least in part, an electrically conductive material. Although FIG. 1 depicts the first conductive plate 102 and the second conductive plate 104 as being rectangular in shape, in various implementations, the first conductive plate 102 and the second conductive plate 104 can be comprised of applicable other shapes, such as, as viewed from one side, polygons or ellipses, but, more generally, an applicable three-dimensional shape. In various implementations, the first conductive plate 102 and/or the second conductive plate 104 can be of a shape such that the corresponding plate exhibits rotational symmetry about the central joint 106.

Figure 2:
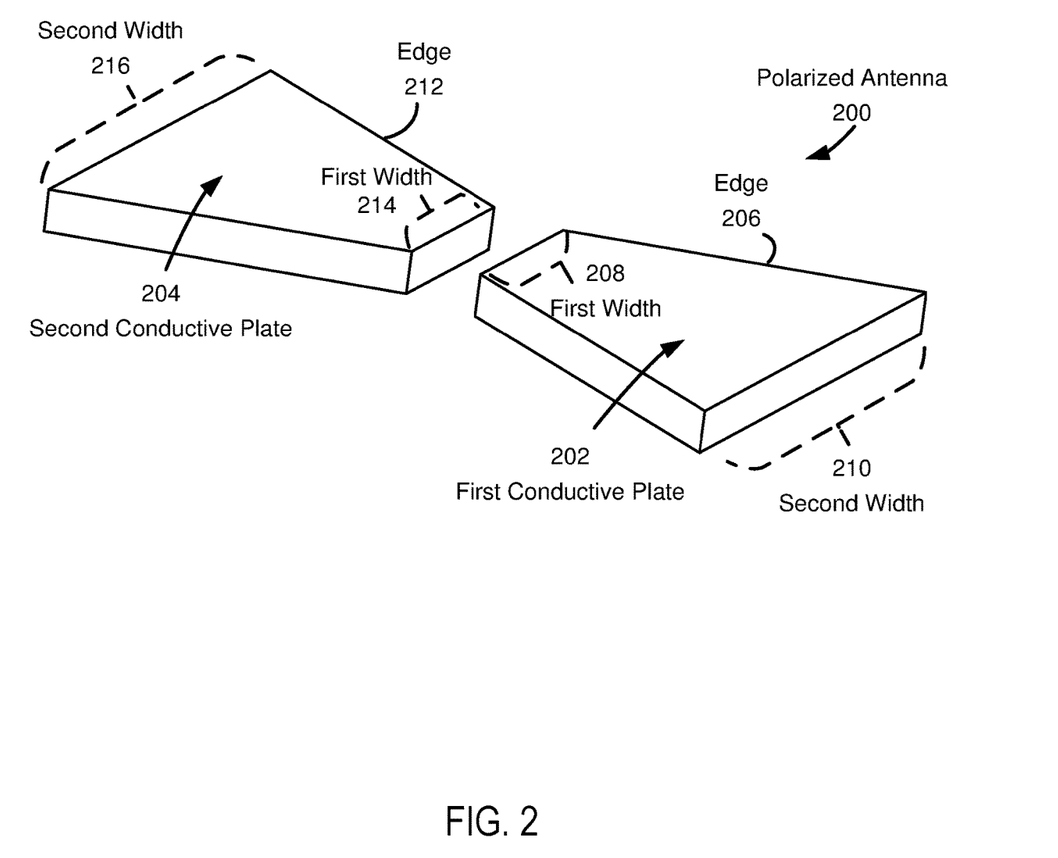
FIG. 2 depicts a perspective view of another example of a polarized antenna.

FIG. 2 depicts a perspective view 200 of another example of a polarized antenna. The polarized antenna can be implemented as part of a network device for transmitting and receiving data according to applicable protocols for forming part of a wireless network, including Wi-Fi, such as the IEEE 802.11 standards. Depending upon implementation-specific or other considerations, the polarized antenna can be positioned to be vertically polarized with respect to a network device.

In a specific implementation, the polarized antenna is wirelessly coupled through a Wi-Fi connection to an end user device, which acts as or includes a station. A station, as used in this paper, can be referred to as a device with a media access control (MAC) address and a physical layer (PHY) interface to a wireless medium that complies with the IEEE 802.11 standard. Thus, for example, the end user devices can be referred to as stations, if applicable.

In a specific implementation, the polarized antenna is part of a network device which is compliant with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand.

In a specific implementation, the polarized antenna is coupled to a radio. Depending upon implementation-specific or other considerations, a radio can be a 2.4 GHz to 5 GHz dual band radio or a 5 GHz only radio. Further depending upon implementation-specific or other considerations, the polarized antenna can be included as part of a network device that includes radios operating in the same frequency band concurrently. For example, the polarized antenna can be included as part of a network device including a first radio operating in the 5 GHz band concurrently with a second radio operating in the 5 GHz band. In another example, the polarized antenna can be included as part of a network device including a 2.4 GHz to 5 GHz dual band radio operating in the 5 GHz band concurrently with a 5 GHz only radio operating in the 5 GHz band.

In the example of FIG. 2, the polarized antenna includes a first conductive plate 202 and a second conductive plate 204. In various implementations, the first conductive plate 202 and the second conductive plate 204 are comprised of, at least in part, an electrically conductive material. The first conductive plate 202 linearly increases in width along an edge 206 from a first width 208 to a second width 210. The second conductive plate 204 linearly increases in width along an edge 212 from a first width 214 to a second width 216. The shape of the antenna is intended to illustrate one of many applicable antenna shapes.

Figure 3:
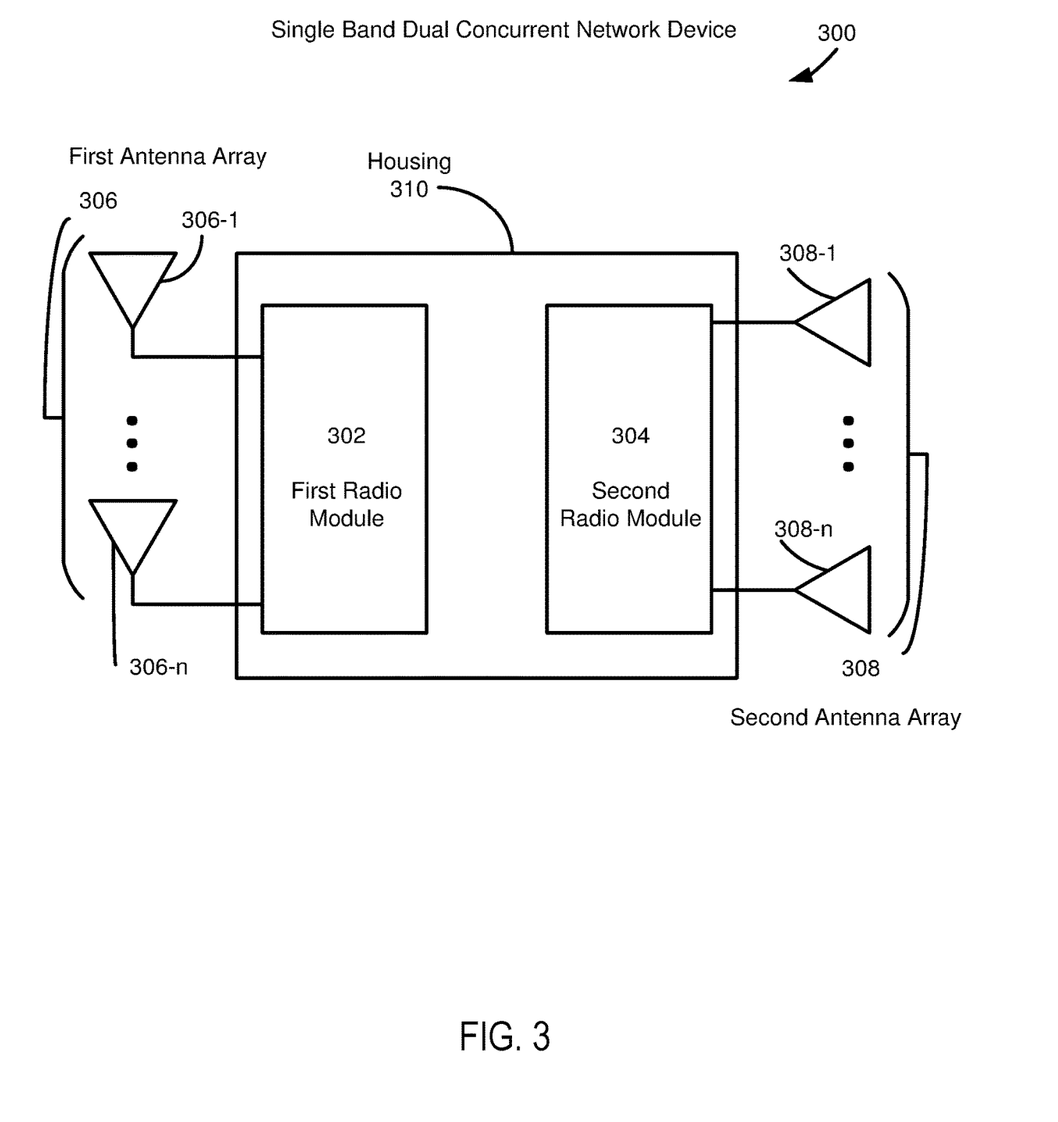
FIG. 3 depicts an example diagram of a single band dual concurrent network device.

FIG. 3 depicts an example diagram 300 of a single band dual concurrent network device. As used in this paper, a network device is intended to represent a router, a switch, an access point, a gateway (including a wireless gateway), a repeater, or any combination thereof. In functioning as a gateway, the network device can transport data from a backend of a network to a device coupled to the network device. In functioning as an access point, the network device can couple a device coupled to the network device to a network associated with the network device. The network device can function according to applicable protocols for forming part of a wireless network, such as Wi-Fi.

Conventional network devices must be of a suitable size for consumer adoption. Because a typical size of a network device, such as a wireless access point, is small enough to be mounted on a ceiling (typically less than a foot in any horizontal direction and typically no thicker than 2 inches), simultaneous radio operation is considered difficult or impossible. Advantageously, by utilizing polarized antennas, examples of which are discussed above with reference to FIGS. 1-2, a network device can be fashioned to meet the consumer-driven requirements of a relatively small form factor suitable for mounting on ceilings or walls.

As used in this paper, the network device is single band and dual concurrent in that it includes two radio modules capable of operating within the same frequency band simultaneously with non-debilitating mutual interference between signals transmitted by the two radio modules. Depending upon implementation-specific or other considerations, respective antennas utilized by the radios to transmit signals within the same frequency band simultaneously have at least 40 dB or greater of antenna isolation. For example, a first one or a plurality of antennas transmitting signals within the 5 GHz frequency band and operating with a first radio module operating concurrently with a second one or a plurality of antennas transmitting signals concurrently within the 5 GHz frequency band and operating with a second radio module have 45 dB of antenna isolation with the second one or a plurality of antennas.

The single band dual concurrent network device shown in FIG. 3 includes a first radio module 302 and a second radio module 304. Depending upon implementation-specific or other considerations, the first radio module 302 and the second radio module 304 can be mounted on a main printed circuit board (hereinafter referred to as "PCB") of the single band dual concurrent network device or placed in separate modules housed within an enclosure of the single band dual concurrent network device. For example, the first radio module 302 can be integrated as part of a first module and the second radio module 304 can be integrated as part of a second module separate from the first module.

In a specific implementation, either or both the first radio module 302 and the second radio module 304 are dual band radios that are capable of dynamically switching operation between different frequency bands. For example, either or both the first radio module 302 and the second radio module 304 are capable of transmitting signals in the 2.4 GHz and the 5 GHz frequency bands. In another example, only one of the first radio module 302 and the second radio module 304 is capable of transmitting signals in the 2.4 GHz and the 5 GHz frequency bands, while the other is only capable of transmitting signals in the 5 GHz frequency band. In various implementations, the first radio module 302 and the second radio module 304 are capable of operating simultaneously within the same frequency band. For example, both the first radio module 302 and the second radio module 304 can transmit and receive signals in the 5 GHz frequency band simultaneously.

The single band dual concurrent network device shown in FIG. 3 includes a first antenna array 306 comprising antennas 306-1 . . . 306-n and a second antenna array 308 comprising antennas 308-1 . . . 308-n. The first antenna array 306 is associated with the first radio module 302 and is used to transmit and receive signals for the first radio module 302 and the second antenna array 308 is associated with the second radio module 304 and used to transmit and receive signals for the second radio module 304. Depending upon implementation-specific or other considerations, the first antenna array 306 and the second antenna array 308 can include an applicable number of antennas. For example, the first antenna array 306 and the second antenna array 308 can each include four corresponding antennas.

In a specific implementation, antennas forming the first antenna array 306 are of the same polarization, and antennas forming the second antenna array 308 are of the same polarization. For example, antennas forming the first antenna array 306 can all be either vertically polarized or horizontally polarized with respect to the single band dual concurrent network device. In another example, antennas forming the second antenna array 308 can all be either vertically polarized or horizontally polarized with respect to the single band dual concurrent network device. Depending upon implementation-specific or other considerations, antennas forming the first antenna array 306 can be of the same design as the polarized antenna shown in FIG. 1 or the polarized antenna shown in FIG. 2. Further, depending upon implementation-specific or other considerations, antennas forming the second antenna array 308 can be of the same design as the polarized antenna shown in FIG. 1 or the polarized antenna shown in FIG. 2.

In a specific implementation, antennas forming the first antenna array 306 are orthogonally polarized with respect to the antennas forming the second antenna array 308. As a result, the first radio module 302 and the second radio module 304 utilize corresponding polarized antennas that have a 90° phase offset from each other. For example, the first antenna array 306 can be formed by vertically polarized antennas that are positioned to have a +45° phase offset with respect to a center of the single band dual concurrent network device, while the second antenna array 308 can be formed by horizontally polarized antennas that are positioned to have a −45° phase offset with respect to the center of single band dual concurrent network device, thereby leading to a 90° phase offset between the antennas forming the first antenna array 306 and the antennas forming the second antenna array 308. While in the previous example antenna position and phase offset are discussed with respect to a center of the single band dual concurrent network device, positions and phase offsets of antennas forming the first antenna array 306 and antennas forming the second antenna array 308 can be considered with reference to an applicable point, axis, or plane within or in an environment surrounding the single band dual concurrent network device as long as the antennas forming the first antenna array 306 and the antennas forming the second antenna array 308 are orthogonally polarized with respect to each other. Due to orthogonal polarization between antennas forming the first antenna array 306 and antennas forming the second antenna array 308, at least 40 dB of antenna isolation can be achieved between the antennas forming the first antenna array 306 and the antennas forming the second antenna array 308.

In a specific implementation, the first antenna array 306 and the second antenna array 308 are mounted about a main PCB of the single band dual concurrent network device. Antennas of the first antenna array 306 and the second antenna array 308 can be mounted at positions at least 5 mm away from edges of the main PCB. Depending upon implementation-specific or other considerations, the first antenna array 306 and the second antenna array 308 are mounted about a main PCB based on a polarization direction of antennas forming the first antenna array 306 and the second antenna array 308. For example, if antennas forming the first antenna array 306 are vertically polarized with respect to a center of the single band dual concurrent network device, then the antennas can be positioned at 30 mm out from edges of a main PCB along a plane that extends out from the edges of the main PCB. In another example, if antennas forming the second antenna array 308 are horizontally polarized with respect to a center of the single band dual concurrent network device, then the antennas can be positioned 5 mm out from edges of a main PCB along a plane that extends out from the edges of the main PCB and 5 mm below or beneath the plane. In mounting antennas of the first antenna array 306 and the second antenna array 308 at positions away from a main PCB of the single band dual concurrent network device, antenna coupling through the main PCB between the first antenna array 306 and the second antenna array 308 is reduced, thereby leading to at least 40 dB of antenna isolation between the antennas forming the first antenna array 306 and the antennas forming the second antenna array 308.

In a specific implementation, the first antenna array 306 and the second antenna array 308 are mounted onto an antenna plate. Antennas of the first antenna array 306 and the second antenna array 308 can be mounted to an antenna plate such that the antennas are at least 5 mm away from edges of the antenna plate. Depending upon implementation-specific or other considerations, the first antenna array 306 and the second antenna array 308 are mounted to an antenna plate based on a polarization direction of antennas forming the first antenna array 306 and the second antenna array 308. For example, if antennas forming the first antenna array 306 are vertically polarized with respect to a center of the single band dual concurrent network device, then the antennas can be mounted to an antenna plate at positions 30 mm from edges of the antenna plate. In mounting antennas of the first antenna array 306 and the second antenna array 308 to an antenna plate at positions away from edges of the antenna plate, antenna coupling through the antenna plate between the first antenna array 306 and the second antenna array 308 is reduced, thereby leading to at least 40 dB of antenna isolation between the antennas forming the first antenna array 306 and the antennas forming the second antenna array 308. Depending upon implementation-specific or other considerations, an antenna plate to which antennas of the first antenna array 306 and the second antenna array 308 are mounted can be positioned within the single band dual concurrent network device such that spacing between the antennas of the first antenna array 306 and the second antenna array 308 and edges of a main PCB or other applicable common metal structure is at least 5 mm. For example, an antenna plate can be mounted at a position on top of, on bottom of, or on side of a main PCB such that spacing between antennas of the first antenna array 306 and the second antenna array 308 and edges of the main PCB is at least 5 mm.

The single band dual concurrent network device includes a housing 310. While antennas of the first antenna array 306 and antennas of the second antenna array 308 are shown to extend out of the housing 310 in FIG. 3, this is shown for conceptual purposes and it is understood that the antennas can be contained within the housing 310 or integrated as part of the housing 310. Depending upon implementation-specific or other considerations, the housing 310 can have a footprint less than 50 cm by 50 cm. For example, the housing 310 can have a footprint that is less than or equal to 40 cm by 40 cm.

In a specific implementation, the single band dual concurrent network device includes low noise amplifiers (hereinafter referred to as "LNAs") coupled to the antennas. Gain of the LNAs can be adjusted in order to increase the dynamic range of the first radio module 302 and the second radio module 304. In increasing the dynamic range of the first radio module 302 and the second radio module 304, the first radio module 302 and the second radio module 304 are capable of receiving signals at larger strengths and weaker strengths resulting from interference caused by concurrent operation of the first radio module 302 and the second radio module 304 within the same frequency band. Depending upon implementation-specific or other considerations, gain of the LNAs can be adjusted using either or both a bypass circuit or post LNA attenuation circuitry. For example, signals amplified by the LNA can be attenuated in order for the radio modules to process signals with larger strength caused by mutual interference.

In an example of operation of the example single band dual concurrent network device shown in FIG. 3, the first radio module 302 operates in the 2.4 GHz frequency band while the second radio module 304 simultaneously operates in the 5 GHz frequency band. In the example of operation of the example network device shown in FIG. 3, the first radio module 302 switches to operation in the 5 GHz frequency band while the second radio module 304 continues to operate, simultaneously with the first radio module 302, in the same 5 GHz frequency band. Further, in the example of operation of the example network device shown in FIG. 3, at least 40 dB of antenna isolation is maintained between the first radio module 302 and the second radio module 304.

Figure 4:
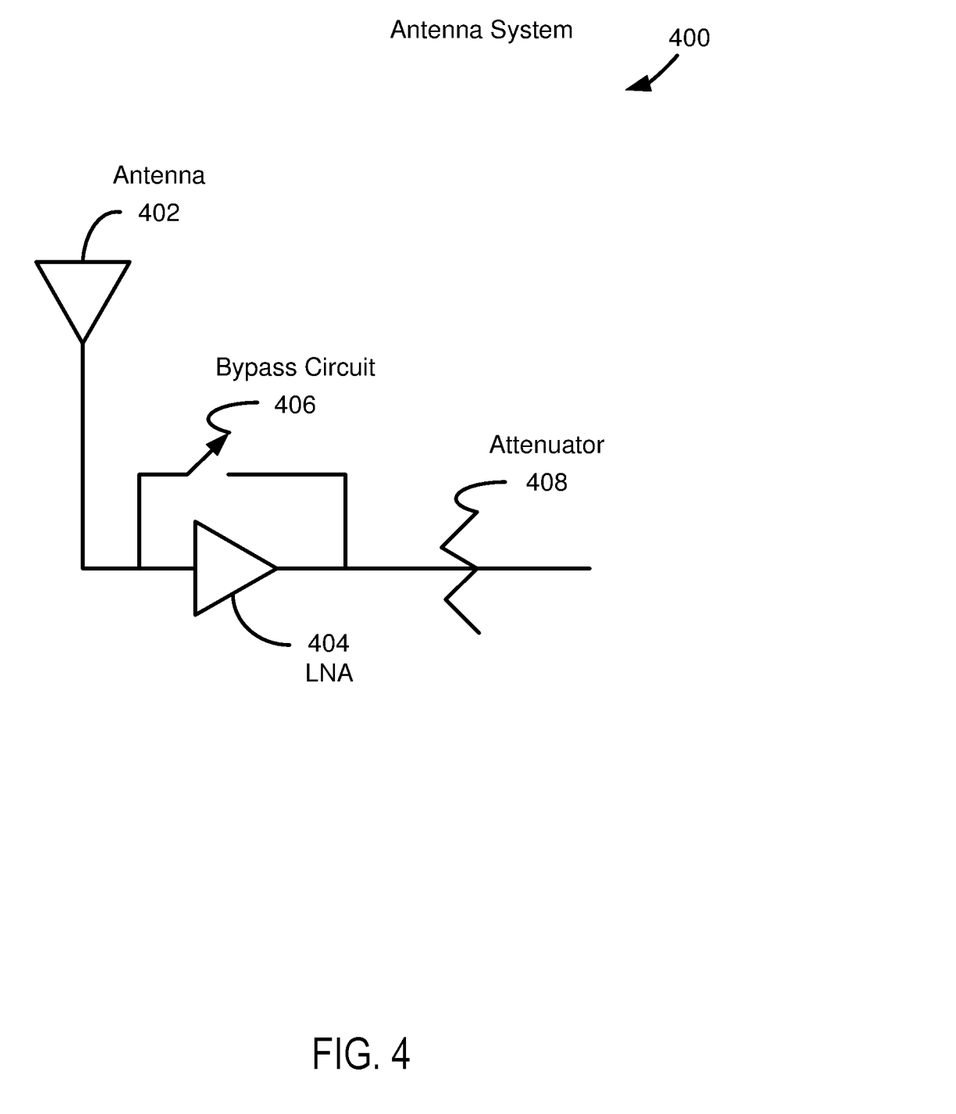
FIG. 4 is a diagram of an example antenna system including an antenna coupled to a low noise amplifier with low noise amplifier gain control to increase a dynamic range of a radio module coupled to the antenna.

FIG. 4 is a diagram 400 of an example antenna system including an antenna coupled to a LNA with LNA gain control to increase a dynamic range of a radio module coupled to the antenna. The example antenna system can be integrated as part of the single band dual concurrent network devices described in this paper. The example antenna system shown in FIG. 4 can be used to increase the dynamic range of a radio module, therefore allowing for the radio module to handle a larger number of signals distorted by interference.

The example antenna system shown in FIG. 4 includes an antenna 402 coupled to a LNA 404. The antenna 402 can be a polarized antenna according to the antennas shown in FIGS. 1-2. Depending upon implementation-specific or other considerations, the antenna 402 can be horizontally polarized or vertically polarized for use in a single band dual concurrent network device.

The example antenna system shown in FIG. 4 includes a bypass circuit 406. The bypass circuit is intended to represent a component for providing a bypass to the LNA 404 using an applicable technology. The bypass circuit 406 functions to change the gain of the LNA 404, thereby increasing a dynamic range of a radio module using the example antenna system.

The example antenna system shown in FIG. 4 includes an attenuator 408. The attenuator 408 can include any applicable means for attenuating a signal from the LNA 404. In attenuating a signal from the LNA 404, the attenuator 408 changes the gain of the LNA, thereby increasing a dynamic range of a radio module using the example antenna system.

These and other examples provided in this paper are intended to illustrate but not necessarily limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A network device, comprising:
   a first antenna array comprised of a first plurality of polarized antennas, the first plurality of polarized antennas being vertically polarized with respect to the network device, the first plurality of polarized antennas being wirelessly coupled to a first station and configured to transmit and receive first radio signals for the first station in a first frequency band;
   a second antenna array comprised of a second plurality of polarized antennas, the second plurality of polarized antennas being horizontally polarized with respect to the network device, the second plurality of polarized antennas being wirelessly coupled to a second station and configured to transmit and receive second radio signals for the second station in the first frequency band; and
   a main printed circuit board, wherein the first plurality of polarized antennas are positioned away from edges of the main printed circuit board along a plane that extends out from the edges of the main printed circuit board, wherein, in operation, the first station and the second station function concurrently using the first frequency band while antenna isolation is maintained between the first antenna array and the second antenna array, wherein a polarized antenna of the first plurality of polarized antennas or the second plurality of polarized antennas comprise a first conductive plate and a second conductive plate, and the first conductive plate increases in width along an edge from a first width to a second width, and the second conductive plate increases in width along an edge from a third width to a fourth width.

2. The network device of claim 1, wherein the first plurality of polarized antennas and the second polarity of polarized antennas are wirelessly coupled through a Wi-Fi connection to the first station and the second station, respectively.

3. The network device of claim 1, wherein one of the first station or the second station is adjustable to transmit and receive radio signals in a second frequency band.

4. The network device of claim 1, further comprising an antenna plate, wherein the first plurality of polarized antennas and the second plurality of polarized antennas are mounted to the antenna plate.

5. The network device of claim 1, further comprising low noise amplifiers coupled to the first plurality of polarized antennas and the second plurality of polarized antennas, wherein in operation, gains of the low noise amplifiers are modified to increase dynamic ranges of the first station and the second station.

6. The network device of claim 1, further comprising:
low noise amplifiers coupled to the first plurality of polarized antennas and the second plurality of polarized antennas; and
bypass circuits, attenuators, or a combination thereof coupled to the low noise amplifiers and configured to modify gains of the low noise amplifiers to increase dynamic ranges of the first station and the second station.

7. The network device of claim 1, wherein:
a polarized antenna of the first plurality of polarized antennas or the second plurality of polarized antennas comprises a first conductive plate and a second conductive plate;
the first conductive plate and the second conductive plate are coupled together at a central joint and overlay each other; and
the central joint is fixed such that a plane of the first plurality of antennas is parallel to a plane of the second plurality of antennas or is flexible such that the plane of the first plurality of antennas intersects the plane of the second plurality of antennas.

8. A network device comprising:
a first antenna, the first antenna being vertically polarized with respect to the network device, wirelessly coupled to a first station, and configured to transmit and receive first radio signals for the first station in a first frequency band;
a second antenna, the second antenna being horizontally polarized with respect to the network device, wirelessly coupled to a second station, and configured to transmit and receive second radio signals for the second station in the first frequency band; and
a main printed circuit board, wherein the first antenna is positioned away from edges of the main printed circuit board along a plane that extends out from the edges of the main printed circuit board, wherein, in operation, the first station and the second station function concurrently using the first frequency band while antenna isolation is maintained between the first antenna and the second antenna, wherein the first antenna or the second antenna comprises a first conductive plate and a second conductive plate, and wherein the first conductive plate increases in width along an edge from a first width to a second width, and the second conductive plate increases in width along an edge from a third width to a fourth width.

9. The network device of claim 8, wherein the first antenna and the second antenna are wirelessly coupled through a Wi-Fi connection to the first station and the second station, respectively.

10. The network device of claim 8, wherein one of the first station or the second station is adjustable to transmit and receive radio signals in a second frequency band.

11. The network device of claim 8, further comprising an antenna plate, wherein the first antenna and the second antenna are mounted to the antenna plate.

12. The network device of claim 8, further comprising low noise amplifiers coupled to the first antenna and the second antenna, wherein in operation, gains of the low noise amplifiers are modified to increase dynamic ranges of the first station and the second station.

13. The network device of claim 8, further comprising:
low noise amplifiers coupled to the first antenna and the second antenna; and
bypass circuits, attenuators, or a combination thereof coupled to the low noise amplifiers and configured to modify gains of the low noise amplifiers to increase dynamic range of the first station and the second station.

14. The network device of claim 8, wherein:
the first antenna or the second antenna comprises a first conductive plate and a second conductive plate;
the first conductive plate and the second conductive plate are coupled together at a central joint and overlay each other; and
the central joint is fixed such that a plane of the first antenna is parallel to a plane of the second antenna or is flexible such that the plane of the first antenna intersects the plane of the second antenna.

15. The network device of claim 1, wherein the first plurality of polaraized antennas and the second plurality of polarized antennas are positioned at least 5 mm away from edges of the main printed circuit board.

16. The network device of claim 1, wherein the antenna isolation of at least 40 dB is maintained between the first antenna and the second antenna.

17. The network device of claim 1, wherein the first frequency band is either 2.4 GHz or 5 GHz.

18. The network device of claim 8, wherein the antenna isolation of at least 40 dB is maintained between the first antenna and the second antenna.

19. The network device of claim 8, wherein the first frequency band is either 2.4 GHz or 5 GHz.

20. The network device of claim 15, wherein the first antenna and the second antenna are positioned at least 5 mm away from edges of the main printed circuit board.

* * * * *